3,400,957
NUT LOCKING MEANS
John C. Selden, Avon, Conn., assignor to United Aircraft Corporation, Hartford, Conn., a corporation of Delaware
Filed Sept. 12, 1966, Ser. No. 578,568
9 Claims. (Cl. 287—53)

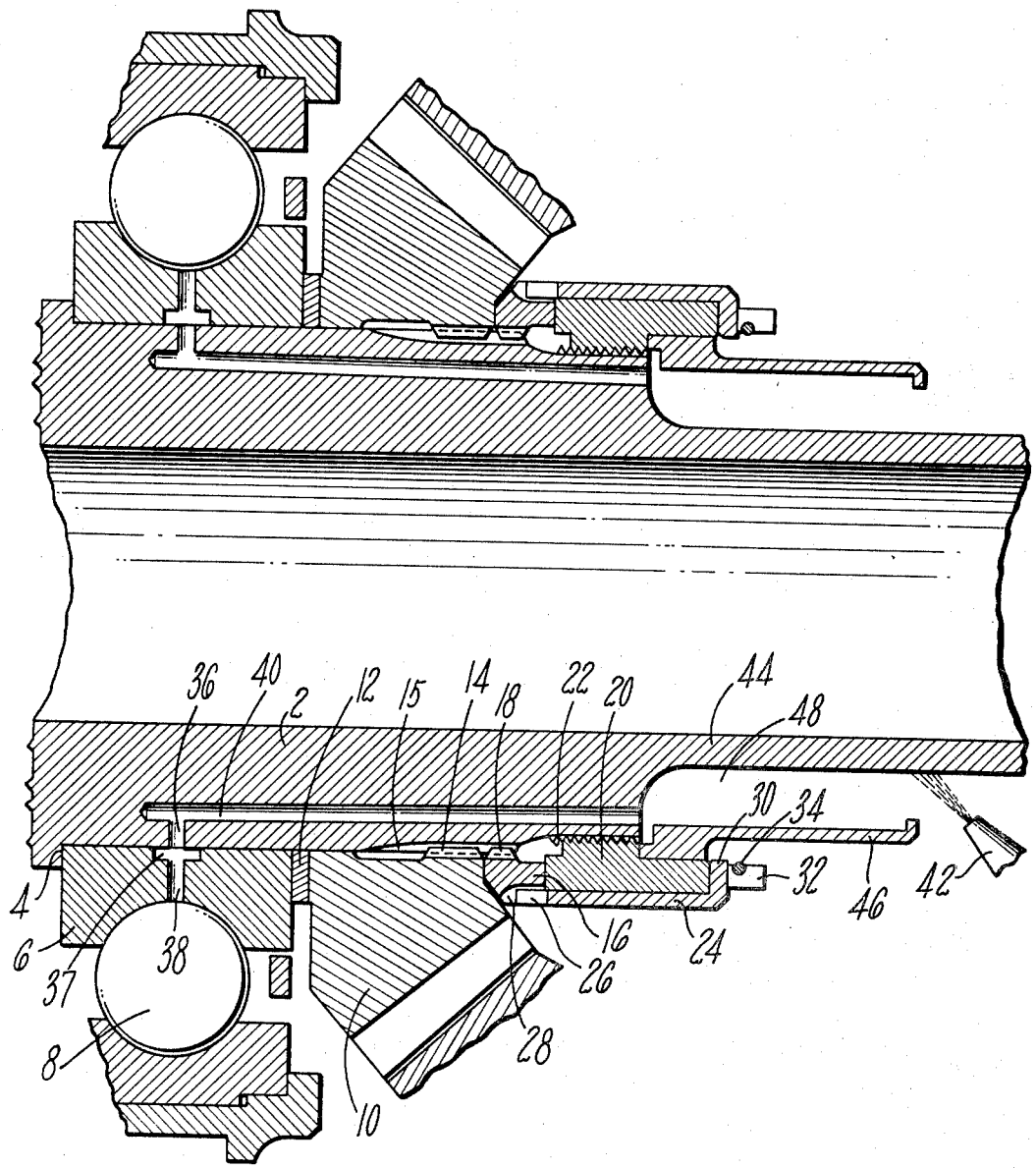

ABSTRACT OF THE DISCLOSURE

A locking device for assembly over a clamping nut and shaft that requires no modification of the shaft, and that is applicable without deformation so that it may be used repeatedly and which nut has axially extending lugs on one end and a sleeve fitting over said nut and having slots on one end to receive said lugs and projections on its other end received in grooves in an adjacent member.

---

This invention relates to a lock for retaining a nut in position on a shaft without modifying the shaft in any sense.

One feature of the invention is a lock that may be assembled over the clamping nut when the latter is in position and serves to retain the nut on the shaft without direct contact with the shaft. This is particularly important where the construction prevents direct connection between the shaft and the lock.

Another feature is a locking means that is readily and simply applied or removed without bending or deformation of any parts and which is therefore repeatedly useable.

Other features and advantages will be apparent from the specification and claims, and from the accompanying drawing which illustrates an embodiment of the invention.

The single figure is a fragmentary sectional view through a portion of a shaft having a nut thereon to which the lock of the invention is applied.

Referring to the drawing the shaft 2 has a shoulder 4 thereon against which the inner bearing race 6 for a bearing 8 is mounted. This bearing race is clamped in place by a ring 10 and a washer 12, the ring in the arrangement shown being a bevel gear although it is obviously not essential that this be the particular device. The ring 10 is held against rotation on the shaft by cooperating splines 14 and 15 on the ring and the shaft.

A splined ring 16 engages the end of the bevel gear 10 and also has splines 18 which cooperate with the same splines 15 on the shaft as used by the bevel gear. A threaded nut 20 engages threads 22 on the shaft and this nut forces the ring 16 and the ring 10 axially to clamp the ring 10 and the bearing race 6 securely in position on the shaft.

When the nut is in position a locking sleeve 24 is placed on the nut in surrounding relation thereto. This locking sleeve has projections 26 at its inner end which engage in grooves 28 in the ring 16 such that when these projections and grooves are in engagement the sleeve 24 cannot turn with respect to the shaft. At its outer end the sleeve 24 has inwardly projecting tabs 30 engaging between spaced projections 32 extending from and integral with the nut 20. The cooperating tabs 30 and projections 32 prevent the nut from turning within the locking sleeve and thus the nut cannot turn on the shaft until the locking sleeve has been removed. A spring ring 34 engaging in a circumferential groove in the inner surfaces of the projections 32 holds the locking sleeve in position.

Lubricant is supplied to the bearing 8 through a radial passage 36 in the shaft to an annular groove 37 and cooperating radial passage 38 in the bearing race. The passage 36 communicates with an axial passage 40 in the shaft and this passage is supplied with oil from a lubricant nozzle 42 located in fixed position beyond the end of the nut 20. The shaft 2 has a shaft extension 44 against which the spray from the nozzle is directed. A lubricant scoop or sleeve 46 which projects from the nut 20 assures that lubricant splashing from the shaft extension into the space 48 between the shaft and the lubricant scoop 46 will be directed into the axial passage 40. The oil scoop or sleeve is preferably formed separately from the nut and subsequently brazed or otherwise permanently attached thereto. It will be apparent that the presence of the sleeve 46 does not interfere with the positioning of the nut on the shaft or in the subsequent positioning of the locking sleeve over the nut.

It is to be understood that the invention is not limited to the specific embodiment herein illustrated and described, but may be used in other ways without departure from its spirit as defined by the following claims.

I claim:

1. In a locking assemblage, a shaft having a shoulder thereon, a plurality of rings on said shaft, a nut on the shaft clamping said rings between it and the shoulder, said nut having axially extending lugs thereon at the outer end and a locking sleeve fitting over the nut with slots to receive the lugs, said sleeve having projections thereon at the end remote from the slots, one of said rings having grooves therein to receive the projections on the sleeve, said one of said rings being locked against rotation on the shaft.

2. A locking assemblage as in claim 1 in which said one of said rings and said shaft have cooperating splines for locking the ring against rotation.

3. A locking assemblage as in claim 1 in which one of the rings is a bearing race.

4. A locking assemblage as in claim 1 in which a snap ring engages within the axially extending lugs to retain the locking sleeve in position.

5. A locking assemblage as in claim 1 in which the nut has an integral oil spinner extending beyond the end of the nut.

6. Locking means including a shaft, a ring splined to the shaft and supported against movement axially in one direction, a nut threaded on the shaft and supporting the ring against axial movement in the other direction, a sleeve surrounding the nut and having an inturned notched flange at one end and a plurality of axially extending fingers on the opposite end, said ring having notches to receive the fingers and said nut having axially projecting lugs to engage the notches in the flange whereby the sleeve prevents the nut from turning with respect to the ring.

7. Locking means as in claim 6 in which the sleeve is axially slidable into position over the nut when the latter is in ring clamping position.

8. Locking means as in claim 6 in which the axially extending lugs are internally grooved to receive a snap ring to retain the sleeve in nut locking position.

9. Locking means as in claim 6 in which the nut carries a projecting sleeve surrounding the shaft and projecting substantially beyond the flanges thereon.

References Cited

UNITED STATES PATENTS

| | | | |
|---|---|---|---|
| 998,514 | 7/1911 | Houghton | 151—29 |
| 3,022,809 | 2/1962 | Kottsieper | 151—29 |
| 3,253,630 | 5/1966 | Phelan | 151—29 |
| 3,290,071 | 12/1966 | Kusiak | 287—53 |

CARL W. TOMLIN, *Primary Examiner.*

ANDREW KUNDRAT, *Assistant Examiner.*